Figure 1:
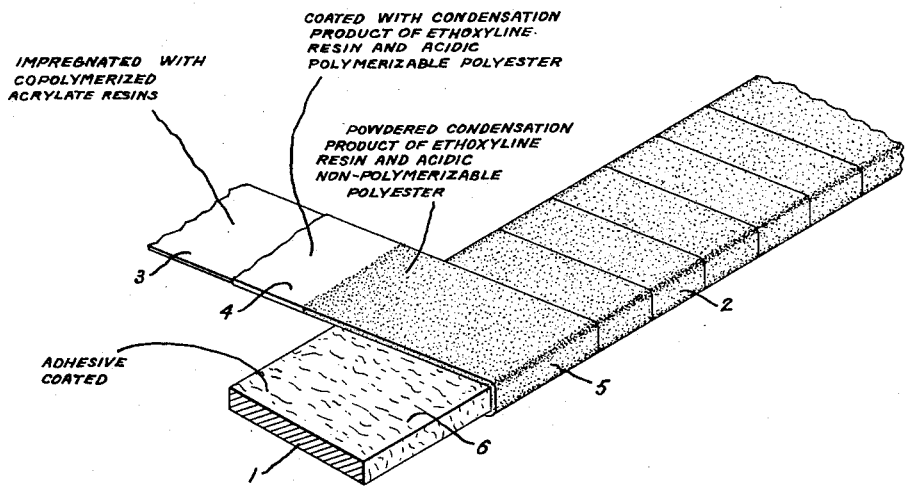

April 6, 1954  P. O. NICODEMUS  2,674,648
ELECTRICAL INSULATION, INSULATED CONDUCTOR, AND
METHOD OF PREPARATION
Filed Oct. 31, 1951

Inventor:
Paul O. Nicodemus,
by His Attorney.

Patented Apr. 6, 1954

2,674,648

UNITED STATES PATENT OFFICE 2,674,648

ELECTRICAL INSULATION, INSULATED CONDUCTOR, AND METHOD OF PREPARATION

Paul O. Nicodemus, York, Pa., assignor to General Electric Company, a corporation of New York Application October 31, 1951, Serial No. 254,145

11 Claims. (Cl. 174—121)

The present invention relates to improved electrical insulation, insulated electrical conductors and methods of preparing the same. In its more specific aspect the invention relates to improved insulation for magnet wire, which includes wire for the stators and rotors of dynamo-electric machines. Magnet wire includes conductors of various cross-sectional form including not only conductors of round and square cross-section, but also flat rectangular conductors of a range of widths and thicknesses. For example, such conductors may be a half inch in width and approximately a sixteenth of an inch in thickness. Insulation for magnet wire must have exceptionally good mechanical and electrical insulating properties, it being desirable that the electrical insulation should occupy minimum space in a magnetic winding.

Insulated electrical conductors of the magnet wire type with which this invention mainly is concerned have been widely used, but those available heretofore have exhibited some shortcomings in physical and electrical properties, especially in the larger rectangular sizes. Asbestos has been applied heretofore to such wire either in the carded state as loose flocculent fibers or as roving or yarn. In either form the asbestos was wrapped on the wire and the wrappings were impregnated with insulating composition. The carded asbestos wrappings tend to build up excessively in thickness on flat surfaces of angular conductors leaving corners and edges with relatively thin layers of insulation. The wrappings of asbestos rovings tended to be uneven, sometimes lumpy and had too great thickness for some service for which the insulation should occupy minimum space. Wire thus insulated did not resist bending and twisting strains without damage to the extent desired for some constructions.

It is an object of the present invention to provide an improved magnet wire and an improved method of its preparation. It is a further object of the invention to provide an improved electrical insulation and an improved tape for insulating electrical conductors as well as a method of preparing the same.

The present invention overcomes the foregoing difficulties and defects by applying to electrical conductors, and with particular advantage to wire of rectangular cross-section, wrappings of inorganic tape which have been pre-impregnated and coated with insulating materials selected in accordance with my invention as will hereinafter be described. These wrappings of tape are consolidated by heat and pressure after having been applied to the wire in desired arrangement whereby individual tape wrappings become so well united as to constitute a substantially unitary insulation.

As a consequence of my invention, conductor wire is provided coated with insulation which is uniform and adherent and will resist abrasion, dislodgement or other damage by bending, twisting, looping or flexing. It has an exceptionally high degree of heat endurance, superior moisture resistance and high dielectric strength. These advantages are combined with decreased thickness of insulation whereby such improved wire occupies less winding space which in turn leads to greater efficiency of electric apparatus embodying such wire.

Figure 2:
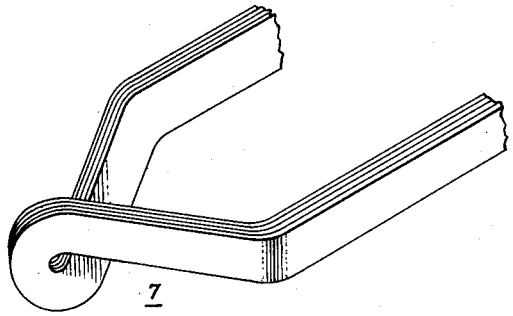

The accompanying drawing shows in Fig. 1, in perspective and magnified in size, a portion of an electrical conductor which is provided with insulation made as indicated in accordance with the present invention; and Fig. 2 shows a portion of a preformed coil made of such improved insulated magnet wire.

As no single material now available possesses all the physical and chemical properties desired in magnet wire insulation, the present invention provides a new combination of insulating materials which cooperatively result in producing a novel electrical insulating coating having the desired properties.

This insulation consists of overlapping wrappings on the conductor of a tough, strong tape carrying a new combination of resinous compositions which upon application are consolidated by heat and pressure to form a tough, strong and adherent coating in which the identity of the individual materials is so completely merged as to produce the effect of a unitary coating having a combination of desired properties of heat endurance, wear resistance, flexibility and small bulk.

The base of such tape consists of a mat of inorganic material either wholly, or to a substantial extent, consisting of inorganic heat resistant fibers, such as asbestos, spun glass, spun quartz or the like. Sheet material made of colloidal clay and asbestos such as described in Walters U. S. Patent 2,493,604, issued January 3, 1950, and assigned to the same assignee as the present invention, also is acceptable. A combination of such materials may also be employed. Preferably asbestos sheet material of suitable thinness and high quality is employed. It is usually advantageous to impregnate such inorganic mat with a small amount of starch as an aqueous solution and drying preliminary to the treatment with insulating materials as will be described. A small amount of starch, say two per cent with a variation more or less of about one-half per cent of starch solids present in the inorganic base does not reduce heat-resisting properties. The starch improves the physical condition of the inorganic sheet material, particularly for the impregnation steps to follow.

The starch-reinforced inorganic sheet material (or tape if such is used) first receives a thermoplastic impregnant which imparts strength and flexibility to the inorganic sheet material as well as improving its insulation and dielectric properties. The impregnant must not become hard and brittle at the temperature at which the wrappings of tape or the wire are consolidated, since the final insulated wire product must be capable of being looped and otherwise bent. A suitable thermoplastic impregnant having these desired properties is a suitable solution of resinous copolymers of derivatives of acrylic acid, for example, methyl acrylate and ethyl acrylate. Impregnants may be used containing 50 to 90% ethyl acrylate and 50 to 10% methyl acrylate although preferably proportional limits are chosen within the limits of 70 to 90% ethyl acrylate and 30 to 10% methyl acrylate which are copolymerized. A suitable material for this purpose is a resin sold by Röhm and Haäs under the trade name of Acryloid C-5. The chosen sheet material is filled or saturated with a solution of a chosen acrylate composition in an easily vaporizable solvent, as, for example, toluene, a solution of 20 per cent solids being satisfactory. The impregnated sheet is freed from solvent by evaporation. In general after elimination of the solvent, the base material should have a content of about 20 to 23 per cent of resin solids.

After impregnation, the asbestos or other inorganic sheet material, although it is improved in strength, flexibility and dielectric properties, is not as tough and abrasion-resistant as desired. To impart these properties the sheet material is coated and to some extent further impregnated with a thermosetting plastic material having these desired properties as well as being heat resistant. A suitable coating material is an intercondensed resinous product of an ethoxyline resin and an acidic polymerizable polyester resin. Such material, which is described and claimed in copending application of William E. Cass, Serial No. 254,208 filed concurrently herewith and assigned to the same assignee as the present application, may be described as the partially condensed product obtained by interacting a mixture of ingredients comprising (1) an acidic polymerizable polyester containing a free carboxyl group and being the product of reaction of a mixture of ingredients comprising a dihydric alcohol, for instance ethylene glycol, and an ethylenically alpha unsaturated, alpha, beta, dicarboxylic acid or anhydride, for example, maleic anhyldride, and (2) a complex epoxide resin comprising a polyether derivative of a polyhydric organic compound, e. g., a polyhydric alcohol or phenol, containing epoxy groups. This intercondensed material, being only partially reacted, is in a soluble and fusible state. Further condensation by heat treatment will transform the described resin to an insoluble, infusible, thermoset material. Hereafter this resin will be referred to for the sake of brevity as "A resin." By reference, the disclosures of the aforesaid concurrently filed Cass application are made part of the disclosures hereof, especially with respect to the mixture of ingredients employed and to the proportions used for the production of the partially intercondensed products described therein.

In the preparation of the acidic unsaturated polymerizable polyesters, various dihydric alcohols may be employed. Among such alcohols may be mentioned, for example, ethylene glycol, diethylene glycol, propylene glycol dipropylene glycol, 1,4-butanediol, etc. Examples of ethylenically alpha unsaturated alpha, beta dicarboxylic acids or anhydrides, if available, which may be used in making the aforesaid acidic unsaturated polyesters are, for instance, maleic, fumaric, itaconic, etc., acids. The term "ethylenically unsaturated dicarboxylic acid," as employed herein, is also intended to include anhydrides.

Various methods may be used to prepare the acidic unsaturated polymerizable polyesters employed with the ethoxyline resins. In order to obtain these acidic unsaturated polyesters, one preferably employs from 0.8 to 2.0 mols of unsaturated dicarboxylic acid per mol of dihydric alcohol and preferably from 1 to 1.5 mols of dicarboxylic acid. If less than 1 mol of dicarboxylic acid or anhydride per mol of dihydric alcohol is used, for example, 0.8 mol of dicarboxylic acid, the esterification reaction must be interrupted before completion in order to obtain the acidic polyester mixture necessary for the practice of this invention. In this latter case, the polyester mixture contains an excess of hydroxyl groups over carboxyl groups. In general, it is preferable to use at least one mol of dicarboxylic acid or anhydride per mol of dihydric alcohol. In preparing the acidic unsaturated polyesters herein employed, it is desirable that the acid number of the polyesters exceed about 50 and preferably be within the range of from about 75 to 200.

These acidic unsaturated polyesters may be generally prepared by heating a mixture of the polyhydric alcohol and the unsaturated dicarboxylic acid or anhydride in the proper molar concentrations at elevated temperatures of the order of from about 150° to 225° C. for a period of time ranging from about 1 to 3 or more hours. A polymerization inhibitor such as t-butyl catechol is advantageously added. Reaction is preferably conducted until the acid number is within the desired range so as to give the acidic unsaturated polyesters required for use with the ethoxyline resins.

The ethoxyline resins defined above as being a complex epoxide resin comprising a polyether derivative of a polyhydric organic compound, e. g., polyhydric alcohol or phenol, containing epoxy groups are disclosed in various places in the art. Among such references may be mentioned Castan Patent 2,324,483, as well as Castan Patent 2,444,333, British Patent 518,057, and British Patent 579,698. For the most part, these ethoxyline resins are based on the resinous product of reaction between an epihalogenohydrin, for instance, epichlorohydrin, and a phenol having at least two phenolic hydroxy groups, for example, bis-(4-hydroxyphenyl) dimethylmethane. U. S. patents 2,494,295; 2,500,600 and 2,511,913 describe other examples of ethoxyline resinous compositions which may be employed in the practice of the present invention. By reference, the aforementioned patents are intended to be included as part of the present description of the ethoxyline resins used and, for brevity, the ethoxyline resins will not be described other than that they contain more than one ethylene oxide group, e. g., from 1 to 2 or more epoxide groups per molecule and may be prepared by effecting reaction between a polyhydroxy phenol or alcohol, for example, hydroquinone, resorcinol, glycerine, or condensation products of phenols with ketones, for instance, bis-(4-dihydroxydiphenyl)-2,2-propane, with epichlorohydrin. For example, the reaction of epichlorohydrin with bis-(4-hydroxyphenyl)-2,2-propane may be formulated as follows:

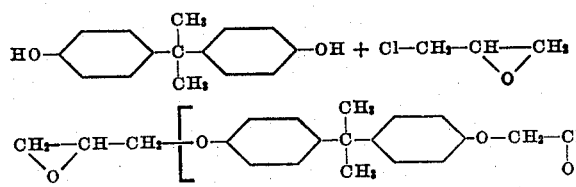

Where $n$ has an average value varying from around zero to about 7. Many of these ethoxyline resins are sold under the name of Epon resins by Shell Chemical Corporation or Araldite resins by the Ciba Company. Data on the Epon resins are given in the following table:

*Table*

| Epon No. | Epoxide Equivalent | Approximate Esterification Equivalent | M. P., 0° C. |
|---|---|---|---|
| RN-34 | 225–290 | 105 | 20–28 |
| RN-48 | 192 | 80 | 9 |
| 1064 | 300–375 | 105 | 40–45 |
| 1062 | 140–165 | | Liquid |
| 1004 | 905–985 | 175 | 97–103 |
| 1007 | 1,600–1,900 | 190 | 127–133 |
| 1009 | 2,400–4,000 | 200 | 145–155 |
| 1001 | 450–525 | 130 | 64–76 |

The complex epoxides used with the above-described polymerizable polyesters contain epoxide groups or epoxide and hydroxyl groups as their functional groups and are generally free from other functional groups such as basic and acidic groups.

The proportion of the unsaturated acidic polyester and ethoxyline resin employed may be varied within fairly wide limits; advantageously the unsaturated polyester ranges from about 5 to 75 per cent, preferably from about 30 to 60 per cent, of the total weight of the latter and the ethoxyline resin. It is advantageous to employ the polyester and ethoxyline resins in such proportions that there is present in the mixture from approximately 0.8 to 1.2 polyester acid equivalents for each equivalent of epoxide.

The method by which the unsaturated polyester and the ethoxyline resin may be combined can, of course, be varied and presents no particular difficulty. Usually, it is desirable first to heat the unsaturated polyester resin and while in a fluid condition to add the ethoxyline resin (also heated, if necessary, to a fluid state) and thereafter heat the mixture of ingredients with stirring at temperatures of from 100° to 200° C. for varying lengths of time until a homogeneous composition is obtained. Heating of the mixture effects combination of carboxyl groups of the unsaturated polyester with the epoxide groups of the ethoxyline resin. Continued heating at temperatures ranging from 125° to 200° C. generally results in gelation of the mixture. However, the condensation reaction can be interrupted by cooling the mixture to room temperature to give a fusible, soluble resin in an intermediate state of condensation having good shelf life. It will, of course, be apparent to those skilled in the art that the attainment of the gelled state will be accelerated by the temperature at which the mixture of ingredients is heated and the length of time of heating. Subsequent heating at temperatures of from 150° to 300° C. of the partially reacted, pre-condensed composition generally results in conversion thereof to the substantially insoluble, infusible, cured state.

As an aid to curing the precondensed compositions, it may be desirable to incorporate a free-radical producing catalyst. Examples of such polymerization accelerators which may be used in combination with the ethoxyline resin and the unsaturated acidic polyesters are, e. g., acetyl peroxide, lauroyl peroxide, benzoyl peroxide, tertiary butyl perbenzoate, tertiary butyl hydroperoxide, cyclohexyl hydroperoxide-1, etc. Any suitable amount of polymerization catalyst may be used, but, in general, the catalyst concentration will be within the range of from about 0.1 to 2 per cent, by weight, based on the weight of the acidic polymerizable polyester. Polymerization and condensation of the mixture of resins containing the aforementioned ethoxyline resins may be effected at elevated temperatures, for example, from about 80° to 150° C.

Prior to the application of the wrapping or wrappings of tape, the metal conductor to be insulated is coated, as shown in Figure 1 of the accompanying drawing, with a suitable heat-curable adhesive material 6, for example, an adhesive of the vinyl type, or polyester type, apoxide type, such as the above-described A resin, or of a suitable phenolic resin. Ordinarily the adhesive should be associated with a suitable solvent or thinner. One which has been found particularly suitable comprises a solution of a mixture of resins containing styrene, polyvinyl acetate and a dipropylene glycol maleate adipate polyester, which preferably contains a peroxide catalyst.

When conductors insulated with the impregnated and coated tape are assembled or wound in desired relation, subsequent heat treatment causes an incipient fusion of the above-identified resin resulting in adhesion of adjacent layers of tape windings. Thereupon, by continued curing and completion of the condensation reaction, firm bonding of adjacent layers results. Externally the resin-coated winding has high abrasion resistance and heat resistance.

As a further, but not always indispensable feature of my invention, a second coating of a somewhat different resin is applied to the exterior of the previously described coating of A resin. This second coating of resin physically differs from the first applied coating by being condensed to a solid state and therefore being capable of being micro-pulverized. As will later appear it is applied as a dust or powder to the underlying solvent-applied A resin.

This second externally applied powdered resin may be defined generically as partially condensed solid product obtained by interacting a mixture of ingredients comprising (1) an acidic low molecular weight polyester containing free carboxyl groups and comprising the product of reaction of a mixture of ingredients comprising a polyhydric alcohol, for instance, glycerine, and a non-polymerizable dicarboxylic acid or anhydride, for example, phthalic acid or anhydride and (2) a complex epoxide resin comprising a polyether derivative of a polyhydric organic compound, e. g., a polyhydric alcohol or phenol, containing epoxy groups. The aforesaid intercondensed products (which will be briefly referred to as "B resin") are more particularly disclosed and claimed in the copending application of William E. Cass, Serial No. 254,207, filed concurrently herewith and assigned to the same assignee as the present application. By reference, the disclosures of the aforesaid concurrently filed Cass application are made part of the disclosures hereof, especially with respect to the mixture of ingredients employed and to the proportions used for the production of the partially intercondensed products described therein.

In the preparation of acidic, low molecular weight nonpolymerizable polyesters, various polyhydric alcohols may be employed. Among such alcohols may be mentioned, for example, ethylene glycol, diethylene glycol, propylene glycol, glycerol, pentaerythritol, etc. Examples of non-polymerizable dicarboxylic acids or anhydrides, if available, which may be used in making the aforesaid polyesters are, for instance, succinic, adipic, sebacic phthalic, isophthalic, terephthalic, chlorinated phthalic acids, etc. Reference to the term "dicarboxylic acid" is intended to include not only the acid per se but also available anhydrides of the aforesaid acids.

Various methods may be used to prepare the highly acidic low molecular weight non-polymerizable polyesters employed with the ethoxyline resins. In order to obtain the highly acidic polyesters it is essential that the dicarboxylic acid or anhydride be employed in an equivalent excess over the polyhydric alcohol. Thus, in the case of a dihydric alcohol, one may advantageously employ for each mol of dihydric alcohol, from about 1.1 to 2.0, preferably from 1.5 to 2.0, mols of the dicarboxylic acid. In the case of the use of trihydric alcohols, for example, glycerine, it has been found that for each mol of glycerine, from about 2.2 to 3 mols, preferably from 2.5 to 3.0 mols, of the dicarboxylic acid, for example, phthalic acid or anhydride, may be used. When using tetrahydric alcohols such as pentaerythritol, it is advantageous to use from about 3.3 to 4.0 mols of the dibasic acid per mol of tetrahydric alcohol.

In preparing the non-polymerizable non-acidic polyesters, it is desirable for many applications that the acid number of the polyesters exceed about 150, preferably in excess of 200. These polyesters may be prepared generally by heating a mixture of the polyhydric alcohol and the dicarboxylic acid or anhydride in the proper molar concentrations at elevated temperatures of the order of from about 150° to 250° C. for a period of time ranging from about 1 to 3 or more hours. Reaction is preferably conducted until the acid number is within the desired range, and most of the hydroxyl groups have been esterified so as to give the highly acidic low molecular weight polyesters required for use with the ethoxyline resins.

The proportion of acidic non-polymerizable polyester and ethoxyline resin employed may be varied within fairly wide limits. Generally, it is preferred to use the acidic non-polymerizable polyester in an amount ranging from about 5 to 70 per cent, of the total weight of the latter and the ethoxyline resin, the actual proportion of ingredients depending upon the specific acidic non-polymerizable polyester and ethoxyline resin employed. Preferably one employs the polyester and ethoxyline resins in such proportions that there is present in the mixture from approximately 0.8 to 1.2 polyester acid equivalents for each equivalent of epoxide.

Unless protected in some way, continuous contacting layers of tape coated with A resin in a partially cured state are likely to adhere to one another to some extent on the pads (rolled stock tape) and also present some difficulty due to stickiness in application to the conductors by the operation of a winding machine (not shown).

The B resin being hard and brittle in a partially condensed state, is adapted to be micropulverized. As a powder the B resin is applied to and will adhere to the surface of the A resin coating which has been previously applied. The B resin is compatible with the underlying A resin when the wound tape applied to a conductor is submitted to heat and pressure. The B resin has a softening point in the neighborhood of 130° C., and when softened or melted, it has good adhesive properties. The external coating of B resin not only prevents undesired sticking of the tape on the rolled pad, but also improves the properties of the composite insulation after having been wound on a conductor and cured in situ by the application of heat and pressure.

The accompanying drawing in Fig. 1 shows, greatly enlarged, a piece of rectangular magnet wire 1 on which is wound in overlapping relation an impregnated and coated tape 2 prepared as above-described. The drawing shows a portion 3 of the base mat of impregnated inorganic fibrous mat with the coating 4 of thermosetting A resin removed. Fig. 1 also shows by a stipple the external coating 5 of powdered B resin. In some cases a plurality of superimposed layers of the described tape (not shown) may be wrapped on the conductor.

The wrapped conductor which may have any desired cross-section round or rectangular is subjected to heat and pressure to consolidate and heat-convert the A and B resins to the infusible, insoluble state. In general a temperature of about 200 to 250° C. and a pressure of about one to three lbs. per square inch will suffice, the specific heat and pressure chosen depending on the size of the conductor being insulated. As a result of the heat and pressure step, which sometimes is repeated one or more times, the wrappings are so consolidated as substantially to lose their identity as individual wrappings. The resultant coating has a high di-electric strength, and can be operated indefinitely at about 150° C. It is substantially uniform in thickness; that is, without being built up in some areas and too thin in others. The thinness and uniformity of the insulation will result in a winding or coil such as shown in Fig. 2 having smaller over-all dimensions, permitting more windings in the same space. Designers of electric apparatus thus may apply more copper, that is more conductors, per unit cross-section of a magnet or coil, with a resulting gain in efficiency.

Fig. 2 indicates the bending and twisting strains to which magnet wire is subjected in coil fabrication. As shown in Fig. 2, it is customary in most cases to bend the individual wires on the narrow dimension for making an end turn as indicated at 7 instead of bending the wires on a flat surface. These sharp bends impose severe strains on the insulation which, however, will not damage insulation made in accordance with the present invention.

I wish it to be understood that my invention is not to be limited to the precise details herein disclosed for obvious modifications will occur to a person skilled in the art.

What I claim as new and desire to secure by Letters Patent of the United States is:

1. Electrical insulation comprising flexible fibrous inorganic material permeated with an acrylate copolymer of from 50 to 90% ethyl acrylate and from 10 to 50% methyl acrylate, the aforesaid acrylate-permeated fibrous material being coated with a resinous product obtained by partially intercondensing a mixture of ingredients comprising, by weight, (a) from 25 to 95% of an ethoxyline resin comprising a polyether derivative of a polyhydric organic compound containing epoxy groups and (b) from 5 to 75% of an acidic unsaturated polymerizable polyester, said polyester having an acid number in excess of 50 and being the product of reaction of a mixture of ingredients comprising an aliphatic dihydric alcohol and an alpha unsaturated alpha, beta dicarboxylic acid.

2. A magnet wire having an adherent insulating wrapping thereon comprising flexible, fibrous, inorganic tape permeated with an acrylate copolymer of from 50 to 90% ethyl acrylate and from 10 to 50% methyl acrylate, the aforesaid acrylate-permeated fibrous material being coated with a partially intercondensed resinous product obtained by intercondensing a mixture of ingredients comprising, by weight, (a) from 25 to 95% of an ethoxyline resin comprising a polyether derivative of a polyhydric organic compound containing epoxy groups and (b) from 5 to 75% of an acidic unsaturated polymerizable polyester having an acid number in excess of 50 and being the product of reaction of a mixture of ingredients comprising an aliphatic dihydric alcohol and an alpha unsaturated alpha, beta dicarboxylic acid.

3. A tape for insulating electrical conductors comprising flexible, fibrous, inorganic material permeated with an acrylate copolymer of from 50 to 90% ethyl acrylate and from 10 to 50% methyl acrylate, the aforesaid acrylate-permeated fibrous material being coated with (1) a partially intercondensed product obtained by intercondensing a mixture of ingredients comprising, by weight, (a) from 25 to 95% of an ethoxyline resin comprising a polyether derivative of a polyhydric organic compound containing epoxy groups and (b) from 5 to 75% of an acidic unsaturated polymerizable polyester having an acid number in excess of 50 and being the product of reaction of a mixture of ingredients comprising an aliphatic dihydric alcohol and an alpha unsaturated alpha, beta dicarboxylic acid, and (2) an external coating on the aforesaid treated tape comprising a condensation product of (a) from 30 to 95% of the aforesaid ethoxyline resin and (b) from 5 to 70% of an acidic non-polymerizable polyester having an acid number in excess of 150 and being the product of reaction of a mixture of ingredients comprising an aliphatic dihydric alcohol and a non-polymerizable dicarboxylic acid.

4. A magnet wire having an adherent insulating wrapping thereon comprising flexible, fibrous, inorganic tape permeated with an acrylate copolymer of from 50 to 90% ethyl acrylate and from 10 to 50% methyl acrylate, the aforesaid acrylate-permeated fibrous material being coated with a partially intercondensed resinous product obtained by intercondensing a mixture of ingredient comprising, by weight, (a) from 25 to 95% of an ethoxyline resin comprising a polyether derivative of a polyhydric organic compound containing epoxy groups and (b) from 5 to 75% of an acidic unsaturated polymerizable ester having an acid number in excess of 50 and being the product of reaction of a mixture of ingredients comprising an aliphatic dihydric alcohol and an alpha unsaturated alpha, beta dicarboxylic acid, there being present on the overlapping layers of the above described resin-coated and impregnated fibrous tape material an overlying coating of a precondensed reaction product obtained by effecting reaction between a mixture of ingredients comprising, by weight (a) from 30 to 95% of the aforesaid ethoxyline resin and (b) from 5 to 70% of an acidic non-polymerizable polyester having an acid number in excess of 150 and being the product of reaction of a mixture of ingredients comprising an aliphatic dihydric alcohol and a non-polymerizable dicarboxylic acid.

5. A magnet wire in accordance with that described in claim 2 in which the fibrous insulation material comprises wrappings of asbestos tape.

6. Insulated magnet wire having adherent insulating wrappings thereon comprising asbestos tape permeated with a copolymer of from 50 to 90% ethyl acrylate and from 10 to 50% methyl acrylate, said tape being coated with a heat-converted, substantially infusible resinous material comprising the partially intercondensed product of reaction of a mixture of ingredients comprising, by weight, (a) from 25 to 95% of an ethoxyline resin comprising a polyether derivative of a polyhydric organic compound containing epoxy groups and (b) from 5 to 75% of an acidic polyester comprising an ethylene glycol maleate having an acid number in excess of 50 and having been obtained by effecting reaction between ethylene glycol and maleic anhydride.

7. Insulated magnet wire comprising a copper conductor having a heat-converted adhesive thereon, and adherent wrappings of asbestos tape bound on said wire by said adhesive, said tape being permeated with a copolymer of from 50 to 90% ethyl acrylate and from 10 to 50% methyl acrylate, an additional coating on said tape comprising a heat-converted condensation product of a mixture of ingredients comprising, by weight, (a) from 25 to 95% of an ethoxyline resin comprising a polyether derivative of a polyhydric organic compound containing epoxy groups and (b) from 5 to 75% of an acidic unsaturated polymerizable polyester comprising an ethylene glycol maleate having an acid number in excess of 50 and being the product of reaction of a mixture of ingredients comprising ethylene glycol and maleic anhydride, the above-described treated tape having a superposed outer coating comprising a heat-converted condensation product of a mixture of ingredients comprising, by weight, (a) from 30 to 95% of the aforesaid ethoxyline resin and (b) from 5 to 70% of an acidic glyceryl-phthalate polyester having an acid number in excess of 150.

8. A magnet wire having an adherent insulating tape wrapping thereon comprising an inorganic, flexible, fibrous material permeated with a copolymer of from 50 to 90% ethyl acrylate and from 10 to 50% methyl acrylate, the aforesaid acrylate-permeated tape being coated with a heat-converted, substantially infusible resinous material comprising the partially intercondensed product of reaction of a mixture of ingredients comprising, by weight, (a) from 25 to 95% of a complex ethoxyline resin comprising a polyether derivative of a polyhydric organic compound containing epoxy groups and (b) from 5 to 75% of an acidic unsaturated polymerizable polyester having an acid number in excess of 50 and being the product of reaction of a mixture of ingredients comprising an aliphatic dihydric alcohol and an alpha unsaturated alpha, beta dicarboxylic acid, there being present on the above-described tape a superimposed outer coating comprising a heat-converted condensation product of a mixture of ingredients comprising, by weight, (a) from 30 to 95% of the aforesaid ethoxyline resin, and (b) from 5 to 75% of an acidic glyceryl-phthalate polyester having an acid number in excess of 150.

9. The method of insulating magnet wire which comprises coating said wire with a heat-curable adhesive, applying on the coated surface in overlapping relation asbestos tape coated and impregnated with a copolymer of from 50 to 90% ethyl acrylate and from 10 to 50% methyl acrylate, the aforesaid coated and impregnated tape being provided with successive coatings comprising (1) a precondensed resinous product obtained by effecting reaction between a mixture of ingredients comprising, by weight, (a) from 25 to 95% of an ethoxyline resin comprising a polyether derivative of a polyhydric organic compound containing epoxy groups and (b) from 5 to 75% of an acidic unsaturated polymerizable polyester having an acid number in excess of 50 and being the product of reaction of a mixture of ingredients comprising an aliphatic dihydric alcohol and an alpha unsaturated alpha, beta dicarboxylic acid, and thereafter heating the taped conductor at an elevated temperature under slight pressure whereby said precondensed resinous product is converted to an infusible and insoluble state forming unitary insulated taped conductor.

10. The method as in claim 9 in which the flexible fibrous inorganic tape comprises an asbestos tape and the acidic unsaturated polyester comprises an ethylene glycol maleate resinous composition having an acid number in excess of 50 and being the product of reaction of a mixture of ingredients comprising ethylene glycol and maleic anhydride.

11. A tape adapted for use as electrical insulation comprising in combination, an asbestos tape impregnated with a copolymer of from 50 to 90% ethyl acrylate and from 10 to 50% methyl acrylate and being successively coated with (1) a partially condensed product of reaction of a mixture of ingredients comprising, by weight, (a) from 25 to 95% of an ethoxyline resin comprising a polyether derivative of a polyhydric organic compound containing epoxy groups and (b) from 5 to 75% of an acidic unsaturated polymerizable polyester comprising ethylene glycol maleate having an acid number in excess of 50 and being the product of reaction of a mixture of ingredients comprising ethylene glycol and maleic anhydride, and (2) a partially condensed product of reaction of a mixture of ingredients comprising, by weight, (a) from 30 to 95% of the aforesaid ethoxyline resin and (b) from 5 to 70% of an acidic glyceryl phthalate polyester having an acid number in excess of 150.

References Cited in the file of this patent

UNITED STATES PATENTS

| Number | Name | Date |
| --- | --- | --- |
| 1,996,314 | Wightman | Apr. 2, 1935 |
| 2,045,103 | Rosch | June 23, 1936 |
| 2,261,983 | Ford | Nov. 11, 1941 |
| 2,269,185 | Dawson | Jan. 6, 1942 |
| 2,550,465 | Gorski | Apr. 24, 1951 |
| 2,569,920 | Buck et al. | Oct. 2, 1951 |
| 2,591,539 | Greenlee | Apr. 1, 1952 |
| 2,595,729 | Swiss et al. | May 6, 1952 |